G. GUADAGNI.
MANUFACTURE OF ARTIFICIAL SILK.
APPLICATION FILED JULY 15, 1908.
978,878.
Patented Dec. 20, 1910.
2 SHEETS—SHEET 2.
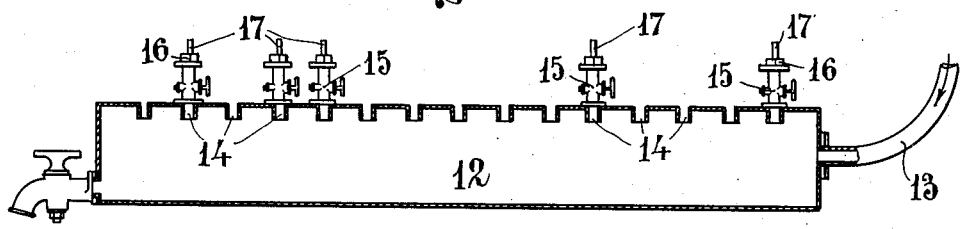
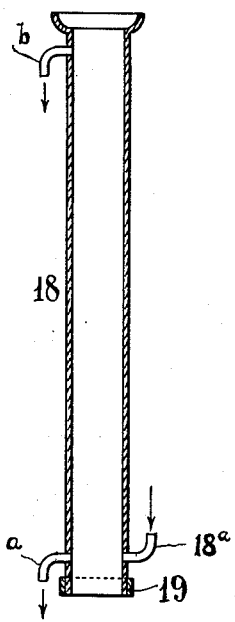
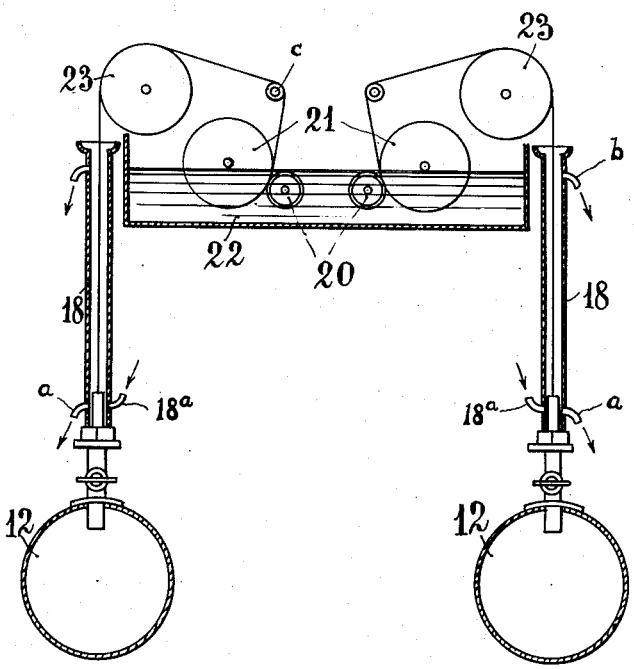
Witnesses.
Jesse N. Lutton.
Inventor.
Giuseppe Guadagni

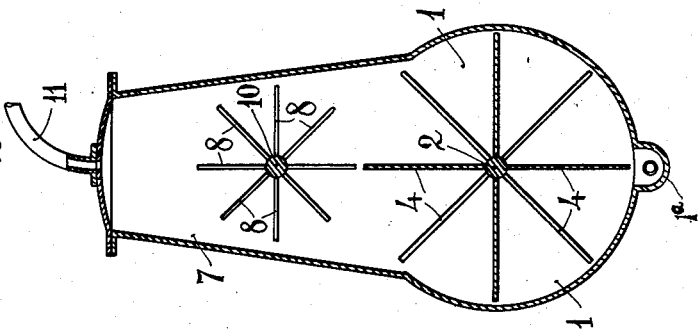
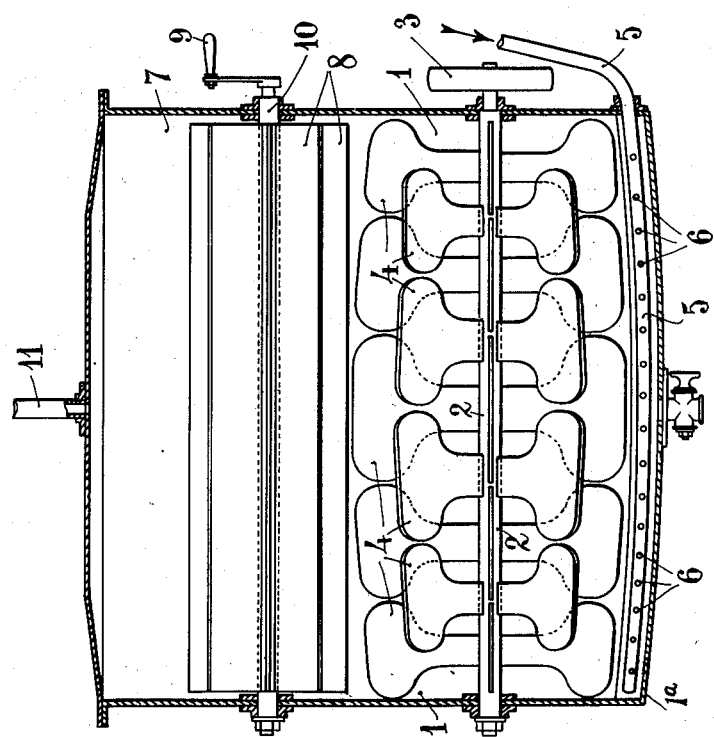

UNITED STATES PATENT OFFICE.

GIUSEPPE GUADAGNI, OF PAVIA, ITALY.

MANUFACTURE OF ARTIFICIAL SILK.

978,878. Specification of Letters Patent. Patented Dec. 20, 1910.

Application filed July 15, 1908. Serial No. 443,655.

*To all whom it may concern:*

Be it known that I, GIUSEPPE GUADAGNI, a subject of the King of Italy, residing at Pavia, Italy, and whose post-office address is Via Genova 22, Turin, Italy, have invented certain new and useful Improvements in the Manufacture of Artificial Silk; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the manufacture of artificial silk from cellulose and has for its object to reduce considerably the duration of the operations incident to its manufacture and the cost of the product, and at the same time produce an article superior to that at present made.

Referring to the drawings in which like parts are similarly designated, Figure 1 is a longitudinal vertical section and Fig. 2 is a transverse vertical section of the vessel in which the cellulose is dissolved. Fig. 3 is a view partly in longitudinal section showing the filament forming device. Fig. 4 is an enlarged view in section, of a tube for containing the hardening liquid. Fig. 5 is a view partly in section showing the manner of forming, winding and washing the filaments.

In carrying out my invention I dispense with the customary washing of the cellulose in caustic soda, chlorin or other solution of oxidizing agents, that have for their object to render the cellulose more solvent in the cupro-ammonium solvent of the cellulose known in the trade as Schweitzer's solution.

According to my invention I wash the cellulose one or more times in water and expel the excess of water by compressing it in a suitable press or in any other manner and then card the same. The cellulose is then ready to be dissolved and is placed in a suitable vessel containing at its bottom the cupro-ammonium solution and at its top the cellulose. Such a vessel suitable for carrying out the present invention is shown in Figs. 1 and 2 and comprises a lower cylindrical section 1 in which is mounted a shaft 2 provided with agitator blades 4 and a pulley mounted on shaft 2 for driving the same. Below the agitator blades I form in the cylindrical portion 1 a depression or gutter 1ª in which lies a pipe 5 supplied with compressed air, said pipe having lateral exit orifices 6. Above the cylindrical portion is a chamber 7 provided preferably with a rotatable bottom comprising a shaft 10 on which is mounted a number of vanes 8. The shaft 10 is provided with a suitable handle or equivalent device for rotating the same and by doing so the cellulose can be uniformly fed into the solution chamber 1. The entire vessel is closed by a tight cover having an exit pipe 11 which is preferably conducted to an absorbent of ammonia. The carded cellulose containing some moisture is placed in the chamber 7 on the rotatable bottom thereof. Compressed air is forced through the pipe 5 into the cupro-ammonium solution which is agitated by the blades 4 and some of the ammonium gas from said solution is carried up through the carded cellulose and out through the pipe 11 while the cellulose is caused to drop into the liquid solvent by rotating through the crank shaft 9 the vanes 8 and is constantly stirred therein by the agitator blades 4.

Heretofore the solution of the cellulose in the cupro-ammonium liquor has been carried out at a low temperature and such temperatures have been maintained somewhere in the neighborhood of six degrees centigrade. I have found that it is not necessary to provide special cooling means for the solution vessel. A sufficiently low degree of temperature being maintained by the passage of the compressed air through the cupro-ammonium solution. The liquid contains hydrate of copper in suspension and the quantity held in suspension should be greatly in excess of that ordinarily used while the ammonium content of the solution is kept low by the air passing through it. I find that the quantity of copper hydrate held in suspension should be about equal to the quantity of cellulose to be dissolved.

I find from my experiments that before the cellulose goes into solution, that it combines first with a molecule of copper to form cupro-cellulose which cupro-cellulose is readily soluble in the cupro-ammonium solution. When using Schweitzer's solution which is a limpid solution of cupro-ammonium

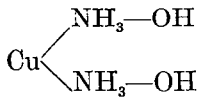

it is not possible to dissolve more than two or three per cent. of the cellulose because it is continuously being depleted of its content of copper in order to produce the copper salt of cellulose so that the remaining liquid is insufficient to dissolve the cuprocellulose as it is formed. That the content of copper in the Schweitzer liquid gradually decreases is shown by the color which at the beginning is light blue and continuously diminishes during the solution of the cellulose. By reason of this I employ an ammoniacal solution containing an excess of oxid or hydrate of copper sufficient to transform all of the cellulose to be dissolved into cupro-cellulose and to obtain a solution of nine or ten per cent. of cellulose and I obtain readily a solution of the cellulose in colloidal form without decreasing the strength of the cupro-ammonium solution beyond that which is necessary for the solution of the cupro-cellulose.

Experiments made with pure cellulose $C_{12}H_{20}O_{10}$ whose molecular weight is 324, gives with copper a composition $C_{12}H_{17}O_7.(CuOH)_3$, that is to say that for each gram molecule of pure cellulose it is necessary to add to the ammonia three gram molecules of the hydrate of copper or another salt of copper corresponding to three gram molecules of the hydrate of copper.

The cellulose first takes up from the ammonia or, to say it better, from the salt of cupro-ammonium that is dissolved therein, the copper necessary to form the cupro-cellulose; at the same time the ammonia dissolves a new quantity of copper oxid taken from the excess of oxid in suspension and gives it up to the new quantity of cellulose that is introduced as soon as the former one has been dissolved. Therefore, as the cuprocellulose is formed, the corresponding quantity of copper hydrate oxid disappears, so that at the end of the operation all of the cellulose and copper oxid is dissolved.

In order that the moist cellulose contained in the reservoir 7 shall not precipitate the copper from the cupro-ammonium solution when coming into contact therewith, by reason of the water contained in the cellulose and thereby retard considerably the operation, the ammonium gases issuing from the ammoniacal solution are carried upward by the air forced through pipe 5 and orifices 6 past the movable vanes 8 into the body of cellulose contained in chamber 7 and saturates the moist cellulose with ammonium. This renders the cellulose readily attackable by the cupro-ammonium solution. The residue of the ammonium gases passes out either into the air or through pipe 11 into a suitable collector not shown. The colloidal solution of cellulose thus obtained is filtered through a filter of any desired construction and is then caused to pass under pressure through capillary orifices where it encounters an acid coagulant. This coagulant consists of a mixture of sulfuric and hydrochloric acids, in such quantities that the total acidity of the bath be sufficient to transform entirely into salts the ammonia and the copper introduced in the stirring cylinder; thus the greatest economy is obtained and the work of recuperation is reduced to a minimum. The sulfuric acid acts to harden or partially parchmentize the filament while the hydrochloric acid forms with the copper a soluble copper salt readily removable by washing and to this end I employ mechanism such as indicated in Figs. 3 to 5. The colloidal solution of cellulose is forced through pipe —13— to a container 12 provided with nipples 14 on which are mounted filament formers 16 having capillary tubes 17 and controlling valves 15. Mounted on each of the filament formers are glass tubes 18 provided with suitable packing rings 19 at their lower ends. In these glass cylinders are contained the coagulant, the capillary tubes 17 projecting above the lower ends of said tubes and the inlet pipes 18ª therefor. When the apparatus works, the coagulant is fed into them at connection 18ª, rises in the tubes 18 and overflows at $b$. When one of the capillary tubes 17 cannot work, the discharge $b$ is closed and the discharge $a$ is opened; the coagulant is thus discharged without rising in the tube —18—. The filament being of less gravity than the coagulant and being forced under pressure through the capillary tubes, rises to the surface of the coagulant. It is then passed over a guide drum 23 positioned so that it is tangent to the center lines of the tube 18. The filament then passes over a guide roll $c$ and between a drum 21 and a bobbin 20 being wound upon said bobbin. The bobbin is immersed in running water contained in a suitable tank 22, preferably lead lined. The drum 21 is driven and rotates the bobbins. Drums 21 and 23 are necessarily of the same diameter and perform the same number of turns. The drum 23 serves to place tension on the thread as it is being formed and the amount of tension determines the thickness of the filaments. After the bobbins 20 have a filament wound on them to a thickness from 10 to 15 millimeters they are removed while still moist to a suitable twisting machine where they are twisted into threads and wound into skeins.

When dried under tension the brilliancy of the filaments is greatly enhanced and this brilliancy is maintained even after subsequent washing.

I claim—

1. In the manufacture of artificial silk, the step which comprises blowing air through a cupro-ammonium solvent and subsequently adding thereto cellulose having any water therein rendered alkaline by a gas to prevent the precipitation of the copper of said solution by the water.

2. In the manufacture of artificial silk, the step which comprises blowing air through a cupro-ammonium solvent, causing said air and the ammonia carried thereby to act on moist cellulose, and then mixing the cellulose with said solution.

In testimony that I claim the foregoing as my invention, I have signed my name in presence of two subscribing witnesses.

GIUSEPPE GUADAGNI.

Witnesses:
   Francesco Simoni,
   Louis Allan.